(12) United States Patent
Lin

(10) Patent No.: US 7,838,078 B2
(45) Date of Patent: Nov. 23, 2010

(54) CLEARCOAT COMPOSITION COMPATIBLE WITH BOTH WATERBORNE AND SOLVENTBORNE BASECOATS

(75) Inventor: Jun Lin, Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1202 days.

(21) Appl. No.: 10/929,239

(22) Filed: Aug. 30, 2004

(65) Prior Publication Data

US 2006/0047036 A1 Mar. 2, 2006

(51) Int. Cl.
B05D 1/36 (2006.01)
(52) U.S. Cl. .................... 427/407.1; 524/547
(58) Field of Classification Search ............. 427/407.1; 428/323, 447; 524/547
See application file for complete search history.

(56) References Cited

U.S. PATENT DOCUMENTS

| | | | |
|---|---|---|---|
| 4,075,141 A | 2/1978 | Porter, Jr. et al. | |
| 4,147,688 A | 4/1979 | Makhlouf et al. | |
| 4,180,489 A | 12/1979 | Andrew et al. | |
| 4,415,681 A | 11/1983 | Horvath | |
| 4,591,533 A | 5/1986 | Antonelli et al. | |
| 4,636,552 A | 1/1987 | Gay et al. | |
| 5,162,426 A | 11/1992 | Hazan et al. | |
| 5,283,084 A | 2/1994 | Lau | |
| 5,747,590 A | 5/1998 | Corcoran et al. | |
| 6,034,166 A | 3/2000 | Jackson et al. | |
| 6,080,816 A | 6/2000 | Gregorovich et al. | |
| 6,337,139 B1 * | 1/2002 | Sapper ........................ 428/524 | |
| 6,355,722 B2 | 3/2002 | Poth et al. | |
| 6,376,016 B1 | 4/2002 | Farquhar et al. | |
| 6,391,968 B1 | 5/2002 | Ohrbom et al. | |
| 6,451,930 B1 | 9/2002 | Burgman et al. | |
| 2003/0170468 A1 * | 9/2003 | Paquet et al. ................. 428/447 |
| 2003/0232222 A1 * | 12/2003 | Anderson et al. ........... 428/704 |
| 2004/0157980 A1 | 8/2004 | Fox et al. | |

FOREIGN PATENT DOCUMENTS

| | | |
|---|---|---|
| EP | 0 995 778 A2 | 4/2000 |
| WO | WO 9205225 A1 * | 4/1992 |
| WO | WO 00/55229 | 9/2000 |
| WO | WO 2005/033233 A2 | 4/2005 |

OTHER PUBLICATIONS

Beeler et al., "Super-High Solids Coatings: Reactive Monomer Molecular Structures", Polymer Preprints, 2003, 44(1), pp. 259-260.
Office Action dated Mar. 28, 2008 in U.S. Appl. No. 10/929,238, filed Aug. 30, 2004.
Office Action dated Apr. 7, 2009 in U.S. Appl. No. 10/929,238, filed Aug. 30, 2004.
Advisory Action dated Aug. 4, 2009 in U.S. Appl. No. 10/929,238, filed Aug. 30, 2004.
Office Action dated Oct. 5, 2009 in U.S. Appl. No. 10/929,238, filed Aug. 30, 2004.
Office Action dated Feb. 22, 2010 in U.S. Appl. No. 10/929,238, filed Aug. 30, 2004.
Advisory Action dated Jun. 10, 2010 in U.S. Appl. No. 10/929,238, filed Aug. 30, 2004.

* cited by examiner

*Primary Examiner*—Michael Barr
*Assistant Examiner*—Robert S Walters, Jr.
(74) *Attorney, Agent, or Firm*—Brian J Myers

(57) ABSTRACT

A curable film-forming coating composition, typically a clearcoat, having improved compatibility over waterborne and solventborne basecoats. The composition includes a film-forming binder comprising a carbamate material, a curing agent, typically a monomeric melamine curing agent, and a hydroxy functional silane component. When used as a clearcoat over a standard pigmented basecoat, the resulting coating provides a substantially wrinkle free appearance and excellent adhesion to both waterborne and solventborne basecoats.

16 Claims, No Drawings

CLEARCOAT COMPOSITION COMPATIBLE WITH BOTH WATERBORNE AND SOLVENTBORNE BASECOATS

FIELD OF THE INVENTION

This invention is directed to curable coating compositions, especially to automotive clearcoat coating compositions compatible with both waterborne and solventborne basecoat compositions.

BACKGROUND OF THE INVENTION

Transportation vehicles, such as automobile and truck bodies, are treated with multiple layers of coatings which enhance the appearance of the vehicle and also provide protection from corrosion, scratch, chipping, ultraviolet light, acid rain and other environmental conditions. Basecoat/clearcoat finishes for automobiles and trucks have been commonly used over the past two decades, in a "wet-on-wet" application, i.e., the transparent clear coat is applied to the basecoat before the colored base coat is completely cured.

Minimum performance requirements for these basecoat/clearcoat finishes include high levels of acid etch resistance, intercoat adhesion, repair adhesion, substrate adhesion, adhesion to windshield bonding adhesives, scratch and mar resistance, chip resistance, humidity resistance, weatherability, and the like. Basecoat/clearcoat coatings and/or the individual components thereof must also be capable of providing excellent visual appearance characterized by a high degree of gloss, distinctness of image (DOI), and smoothness. The latter requirements are particularly important for clearcoat compositions.

Scratch and mar resistance has proven to be a particularly difficult performance property to achieve relative to the balance of other required performance and appearance properties. Scratch and mar resistance typically refers to a coating's ability to resist scratching from mechanical abrasions caused by car wash bushes, tree limbs, keys, fingernails and the like. Scratch and mar resistance are particularly important attributes for clearcoats, as the clearcoat is the exterior most coating in the basecoat/clearcoat system.

In addition to providing the foregoing performance and appearance parameters, the various coating components must be easy to apply in a manufacturing environment.

Finally, any coating composition that is intended for use in a composite basecoat/clearcoat system must be compatible with a wide variety of other coating compositions. For example, a coatings manufacturer may not formulate a basecoat composition for use solely with one particular primer or clearcoat composition. Furthermore, in many automotive paint shops, the clearcoat supplier may not have control over the basecoat formulas that are used. Also, in what is becoming an increasingly desirable two-tone painting operation, two different types of basecoats, i.e., a waterborne basecoat for the main body panel and solventborne basecoat for the lower accent area, are now being used beneath the clearcoat. In such cases where the clearcoat supplier has no control over the basecoat formula, it is particularly desirable to have compatibility with a wide range of basecoat types, including both waterborne and solventborne basecoats.

Compatibility and ease of use with many commercially available coating compositions is thus a necessity for the individual components of a composite basecoat/clearcoat coating system. A successful clearcoat composition will be compatible with both waterborne and solventborne basecoat compositions, as well as medium and high solids versions thereof. This compatibility must exist regardless of the differences in film-forming technology. "Compatible" as used herein refers to a combination of two or more individual coating components which provides acceptable levels of the previously discussed performance, appearance and application requirements of composite basecoat/clearcoat systems.

However, certain basecoat formulations present particular compatibility challenges for the clearcoat coating manufacturer. For example, it has been found that if a waterborne basecoat composition containing free amine is applied to a substrate, followed by the application of a traditional solventborne clearcoat composition comprising a monomeric melamine as a crosslinking resin, upon simultaneous curing of both layers, the resulting cured film appears "wrinkled". This appearance is undesirable and lacks commercial value. It has been found that clearcoat compositions containing polymeric melamines, particularly those containing high imino polymeric melamines, can provide good appearance and wrinkle resistance over amine containing waterborne basecoats. As a result, the current commercially available clearcoats utilize polymeric melamine as the crosslinking entity. However, it has also been found that polymeric high imino aminoplast resins can lead to poor scratch and mar resistance, and unacceptable adhesion over baked solvent or waterborne basecoats, which are now more popularly practiced in vehicle assembly plants where basecoats are sprayed, such as in a two-tone painting operations, over a wet primer in the primer spray booth and baked in the former primer only ovens.

Thus, the challenge for the coatings manufacturer is to provide coating compositions, especially clearcoat compositions, which provide all of the necessary performance, appearance and application properties discussed above but which are further compatible with a wide array of commercially available coating compositions. More particularly, it would be advantageous to retain or improve the performance, appearance and application parameters of prior art clearcoats but without the basecoat compatibility issues discussed above.

Notwithstanding the foregoing, the prior art has failed to provide clearcoat coating compositions which possess the necessary balance between performance, appearance and application requirements but are compatible with a wide variety of basecoat formulations, especially the most challenging basecoat formulations.

Accordingly, it is an object of this invention to provide a coating composition which can be used as a clearcoat over a wide variety of basecoat formulations, including both waterborne and solventborne basecoats, including waterborne basecoats containing free amines, to provide multilayer coated articles which have a substantially wrinkle free appearance, good intercoat adhesion, excellent scratch and mar resistance, and provide desired levels of durability and etch resistance.

SUMMARY OF THE INVENTION

These and other objects have unexpectedly been achieved with a particular combination of binder ingredients. More particularly, the invention herein provides a coating composition, which can be used as a clearcoat over a variety of basecoat formulations, comprising a film-forming binder and an organic liquid carrier; wherein the film-forming binder contains:

(A) a curable film-forming component having a plurality of carbamate groups;

(B) one or more curing or crosslinking agents for component (A) comprising at least one monomeric alkylated melamine formaldehyde resin and preferably essentially no polymeric melamine; and, (C) a hydroxyl functional silane component having at least one hydrolyzable silane group and having a hydroxyl value of about 45 or above.

Optionally, the binder may include:

(D) a second hydroxyl functional silane component having a hydrolyzable silane group and having a lower (when compared to component (C)) hydroxyl value of about 44 or smaller, preferably 40 or smaller.

The invention also provides a method for making a multi-layer coated substrate, such as a multilayer coated vehicle body or part thereof, having a substantially unwrinkled appearance, improved scratch and mar resistance, and improved clearcoat adhesion to both waterborne and solvent borne basecoats and clearcoats. The method comprises applying to a substrate which may be previously primed or sealed, at least a basecoat layer and a clearcoat layer thereover, wherein the clearcoat layer comprises the aforesaid composition. The multi-layer composite coating is then substantially or completely cured to provide a multi-layer coated substrate having the aforementioned desirable characteristics. Lastly, the present invention includes a substrate, such as an automobile or truck body, which is coated with the above-described multi-layer coating.

It has been surprisingly found that the incorporation of particular silane functional compounds in a particular carbamate-melamine binder system provides a coating useful as a clearcoat having improved compatibility over a variety of basecoats and improved scratch and mar resistance.

DETAILED DESCRIPTION OF THE INVENTION

As used herein, except where otherwise noted, the term "plurality" shall mean an average of two or more.

Also, by the term "substantially cured" or "partially cured" is meant that, although at least some curing has occurred, further curing may occur over time.

Also, as used herein, the term "hydrolyzable silane group" means a silyl group having the structure:

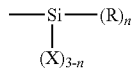

wherein this group is attached to a silyl-containing material by a silicon-carbon bond, and wherein: n is 0, 1 or 2; R is oxysilyl or unsubstituted hydrocarbyl or hydrocarbyl substituted with at least one substituent containing a member selected from the group O, N, S, P, Si; and X is a hydrolyzable moiety selected from the group $C_1$ to $C_4$ alkoxy, $C_6$ to $C_{20}$ aryloxy, $C_1$ to $C_6$ acyloxy, hydrogen, halogen, amine, amide, imidazole, oxazolidinone, urea, carbamate, and hydroxylamine.

The curable film-forming coating composition of the invention is useful for finishing the exterior of automobile and truck bodies and parts thereof. More particularly, this invention provides a carbamate group containing coating that is typically used to form a transparent clearcoat containing no pigments or a small amount of transparent pigment, over a colored basecoat containing solid color pigments or metallic or pearl flake pigments or mixtures thereof. After application and at least partial cure, the composition demonstrates wrinkle free appearance and good intercoat adhesion over both waterborne and solventborne basecoats, even where the basecoat has been previously cured.

The curable coating composition preferably has a relatively high solids content of about 45-90% by weight of binder and correspondingly about 10-55% by weight of an organic carrier which can be a solvent for the binder or a mixture of solvents. The coating of the present invention is also preferably a low VOC (volatile organic content) coating composition, which means a coating that includes less than 0.6 kilograms of organic solvent per liter (5 pounds per gallon) of the composition as determined under the procedure provided in ASTM D3960.

The film-forming portion of the present coating composition, comprising the polymeric, oligomeric and other film-forming components, is referred to as the "binder" or "binder solids" and is dissolved, emulsified or otherwise dispersed in an organic solvent or liquid carrier. The binder solids generally include all the film-forming components that contribute to the solid organic portion of the cured composition. Generally, catalysts, pigments, or chemical additives such as stabilizers are not considered part of the binder. Non-binder solids other than pigments usually do not amount to more than about 5-10% by weight of the composition. In this disclosure, the term "binder" or "binder solids" includes the curable film-forming, carbamate materials, the curing agents, the reactive silane components, and all other optional film-forming components.

The coating composition of this invention contains a novel combination of binder ingredients which render the composition compatible with a broad range of coating components.

The first material in the film forming binder portion of the coating is a curable film-forming carbamate group containing component (A). Curable film forming component (A) may be present in the coating composition in amounts of from about 5 to 60%, preferably from 10 to 55%, by weight, based on the weight of the binder.

Curable film-forming carbamate group containing component (A) may generally be polymeric or oligomeric and will generally comprise an average of at least 2 reactive carbamate groups per molecule. The carbamate groups may be primary or secondary, although this invention is particularly directed to carbamate materials with secondary carbamate groups. Also in this invention, lower molecular weight materials, such as oligomers, are generally preferred.

Such oligomeric carbamate functional compounds will generally have a weight average molecular weight ranging from about 75-2,000, and preferably from about 75-1,500. All molecular weights disclosed herein are determined by GPC (gel permeation chromatography) using a polystyrene standard. These lower molecular weight materials can be prepared in a variety of ways, which are well known in the art.

In a preferred embodiment, these lower molecular weight materials are prepared by reacting a polyisocyanate, preferably an aliphatic polyisocyanate, with a monofunctional alcohol to form an oligomeric compound having multiple secondary carbamate groups, as described in WO 00/55229, the disclosure of which is incorporated herein by reference. This reaction is performed under heat, preferably in the presence of catalyst as is known in the art.

Various polyisocyanate compounds can be used in the preparation of these secondary carbamate compounds. The preferable polyisocyanate compounds are isocyanate compounds having 2 to 3 isocyanate groups per molecule. Typical examples of polyisocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename DESMODUR® N-3390, the trimer of isophorone diisocyanate (isocyanurate) which is sold under the tradename DESMODUR® Z-4470 and the like.

Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimethylol propane and is sold under the tradename of CYTHANE® 3160. When the curable carbamate functional resin of the present invention is used in exterior coatings, the use of an aliphatic or cycloaliphatic isocyanate is preferable to the use of an aromatic isocyanate, from the viewpoint of weatherability and yellowing resistance.

Any monohydric alcohol can be employed to convert the above polyisocyanates to secondary carbamate groups. Some suitable monohydric alcohols include methanol, ethanol, propanol, butanol, isopropanol, isobutanol, hexanol, 2-ethylhexanol, and cyclohexanol.

In another embodiment, the lower molecular weight secondary carbamate materials can be formed by reacting a monofunctional isocyanate, preferably an aliphatic monofunctional isocyanate, with a polyol, as will be appreciated by those skilled in the art.

Typical of such above-mentioned low molecular weight secondary carbamate materials are those having the following structural formulas I-III:

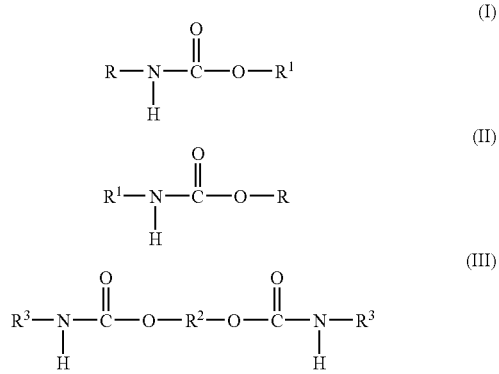

where R is a multifunctional oligomeric or polymeric material; $R^1$ is a monovalent alkyl or cycloalkyl group, preferably a monovalent $C_1$ to $C_{12}$ alkyl group or $C_3$ to $C_6$ cycloalkyl group, or a combination of alkyl and cycloalkyl groups; $R^2$ is a divalent alkyl or cycloalkyl group, preferably a divalent $C_1$ to $C_{12}$ alkyl group or $C_3$ to $C_6$ cycloalkyl group, or a combination of divalent alkyl and cycloalkyl groups; and $R^3$ is either R or $R^1$ as defined above.

Carbamate functional polymers, particularly those with secondary carbamate groups, may also be used in the practice of this invention. Such polymers are well-known in the art. Such polymers can be prepared in a variety of ways and are typically acrylic, polyester, or polyurethane containing materials with pendant and/or terminal carbamate groups. Acrylic polymers are generally preferred in automotive topcoats.

Mixtures of the polymeric and oligomeric carbamate functional compounds may also be utilized in the coating composition of the present invention.

The coating composition also includes, as part of the film-forming binder, one or more curing or crosslinking agents (B). These materials preferably have an average of 2 or more functional groups reactive with the carbamate groups on component (A). In general, crosslinking agent (B) may be present in the coating composition in amounts of from about 15 to 45%, preferably 20 to 40%, by weight, based on the weight of the binder.

A number of crosslinking materials are known that can react with carbamate groups and form urethane linkages in the cured coating, which linkages, are desirable for their durability, resistance to attack by acid rain and other environmental pollutants, and scratch and mar resistance. These include aminoplast resins such as melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and phenoplast resins such as phenol/formaldehyde adducts, as well as curing agents that have isocyanate groups, particularly blocked isocyanate curing agents (e.g., TDI, MDI, isophorone diisocyanate, hexamethylene diisocyanate, an isocyanurates of these, which may be locked with alcohols or oximes), and the like, and combinations thereof.

However, it is an aspect of the invention that at least one or more curing agents (B) be a monomeric alkylated aminoplast resin, particularly a monomeric alkylated melamine formaldehyde resin, which may be fully or partially alkylated. When a monomeric alkylated melamine is used in conjunction with the other binder ingredients herein, it has been found that the cure rate of the coating of the invention can be effectively raised such that strong intercoat adhesion over baked solvent-borne basecoats can be achieved, without sacrificing the wrinkling resistance over waterborne basecoats.

These monomeric aminoplast crosslinking agents are well known in the art and contain a plurality of functional groups, for example, alkylated methylol groups, that are reactive with the pendant or terminal carbamate groups present in the film-forming polymer and are thus capable of forming the desired urethane linkages with the carbamate functional polymers. Most preferably, the crosslinking agent is a monomeric melamine-formaldehyde condensate that has been partially or fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, n-butanol, isobutanol, and cyclohexanol. Most preferably, methanol, n-butanol, or isobutanaol, and blends thereof are used. Such crosslinking agents typically have a weight average molecular weight of about 500-1,500, as determined by GPC using polystyrene as the standard.

It is especially preferred herein that the monomeric melamine be a low imino aminoplast resin. Monomeric melamines having an imino content less than 20% of the total functionality, or 1.2 mole of NH per triazine ring are specially preferred and with a degree of polymerization less than 4 (i.e., 4 triazine rings linked together). More preferred are aminoplast resins having 0 (no imino groups) to 0.8 moles of NH per triazine ring. Remaining sites will preferably be alkylated with methanol, butanol, or other types of alcohol.

The aminoplast resin crosslinking agents of the forgoing type are commercially available from Cytec Industries, Inc. under the trademark CYMEL® and from Surface Specialties UCB under the trade name Resimene®. The other suitable crosslinking agents such as the blocked and unlocked isocyanates are commercially available from Bayer Corporation under the trademark DESMODUR®.

Of course, the crosslinking agents may be combinations of the forgoing, particularly combinations that include a monomeric alkylated melamine crosslinking agent and a blocked isocyanate crosslinking agent.

In addition to the curable carbamate functional material (A) and crosslinking component (B), the coating composition also contains, as part of the film-forming binder, a hydroxyl functional silane compound (C).

This is a key component of the composition of the present invention, as it provides for additional crosslinking through condensation type reactions. The hydroxyl functional silane component may be incorporated in the film-forming portion of the coating in an amount sufficient to achieve improved appearance over both solventborne basecoats and waterborne basecoats in absence of polymeric melamines, as well as improved intercoat adhesion over baked solvent borne basecoats and clearcoats. Typically, the hydroxyl functional silane component (C) is used in an amount ranging from about 10 to 50% by weight, preferably from about 15 to 45% by weight, based on the weight of the binder.

The hydroxyl functional silane material (C) utilized herein is a compound that contains an average of one or more hydrolyzable silyl groups and has a hydroxyl value of about 45 or higher, preferably 60 to 150. This material can be an oligomeric or polymeric material including a polysiloxane based material. In this invention, polymeric materials, especially those prepared from ethylenically unsaturated monomers which are listed hereinafter, are generally preferred.

The hydroxy functional silane polymers that preferably may be used in the practice of this invention can be prepared in a variety of ways and are typically acrylic, polyester or epoxy containing materials. Acrylic polymers are generally preferred in automotive topcoats. Such polymers will generally have a weight average molecular weight of 1,000-30,000, and preferably between 2,000 and 10,000 as determined by gel permeation chromatography (GPC) using polystyrene as the standard.

In a preferred embodiment, the hydroxy functional silane polymer (C) is the polymerization product of ethylenically unsaturated monomers such as are listed hereinafter, of which from about 5 to 80% by weight, preferably 10 to 60% by weight, and more preferably 15 to 40% by weight, based on the weight of the polymer, are ethylenically unsaturated monomers which contain hydrolyzable silane functionality. The average number of hydroxyl groups on the polymer can vary; however such materials should have a hydroxyl number greater than 45, preferably ranging from about 60 to 150, and more preferably from about 80 to 100 (mg KOH/g resin solids), in order to achieve the desired film properties.

One way to prepare these polymers is to copolymerize the ethylenically unsaturated monomer having silane functionality into a polymer prepared from ethylenically unsaturated monomers. For example, silane functional groups can be incorporated into a polymer prepared from ethylenically unsaturated monomers by copolymerizing, for example, an ethylenically unsaturated silane functional monomer with a hydroxy functional non-silane containing ethylenically unsaturated monomer, such as a hydroxy functional alkyl acrylate or methacrylate, and optionally other polymerizable non-silane containing ethylenically unsaturated monomers.

Useful hydroxy functional ethylenically unsaturated monomers containing either primary or secondary hydroxyl groups include, for example, hydroxy alkyl (meth)acrylates meaning hydroxy alkyl acrylates and hydroxy alkyl methacrylates having 1-4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. The presence of hydroxy functional monomers enables additional crosslinking to occur between the hydroxy groups and silane moieties on the silane polymer and/or between the hydroxy groups with other crosslinking groups (such as melamine groups) that may be present in the top coat composition, to minimize silicon stratification in the final top coat and provide optimal recoat adhesion.

Other suitable non-silane containing monomers include alkyl acrylates, alkyl methacrylates and any mixtures thereof, where the alkyl groups have 1-12 carbon atoms, preferably 2-8 carbon atoms. Suitable alkyl methacrylate monomers are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohlexyl methacrylate, trimethylcyclohexyl acrylate, isobornyl methacrylate, isobornyl acrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to non-silane containing alkyl acrylates or methacrylates, other polymerizable monomers, up to about 50% by weight of the polymer, can be also used in the hydroxy functional silane polymer for the purpose of achieving the desired properties such as hardness, appearance, and the like. Exemplary of such other monomers are styrene, methyl styrene, acrylamide, acrylonitrile, methacrylonitrile, and the like.

The silane containing monomers that may be utilized in forming the hydroxy silane material include alkoxy silanes having the following structural formula:

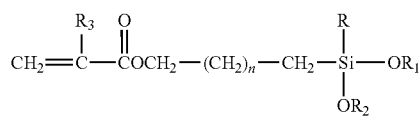

where R is either $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1. Typical examples of such alkoxysilanes are the acrylatoalkoxy silanes, such as gamma-acryloxypropyl trimethoxysilane and the methacrylatoalkoxy silanes, such as gamma-methacryloxypropyl trimethoxysilane (Silquest® A-174 from Crompton), and gamma-methacryloxypropyltris(2-methoxyethoxy) silane.

Other suitable alkoxy silane monomers have the following structural formula:

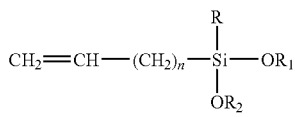

where R, $R_1$ and $R_2$ are as described above and n is 0 or a positive integer from 1 to 10. Examples of such alkoxysilanes are the vinylalkoxy silanes, such as vinyltrimethoxy silane, vinyltriethoxy silane and vinyltris(2-methoxyethoxy)silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Silane functional macromonomers also can be used in forming the hydroxy functional silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above-mentioned silane functional macromonomers are those having the following structural formula:

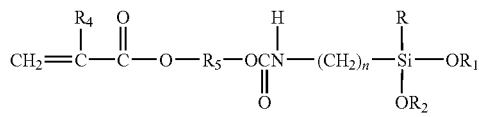

where R, $R_1$, and $R_2$ are as described above; $R_4$ is H or $CH_3$, $R_5$ is an alkylene group having 1-8 carbon atoms and n is a positive integer from 1-8.

Consistent with the above mentioned components, an example of a hydroxy functional acrylic silane polymer useful in the practice of this invention is composed of polymerized monomers of styrene, an ethylenically unsaturated alkoxy silane monomer which is either an acrylate, methacrylate or vinyl alkoxy silane monomer or a mixture of these monomers, a nonfunctional acrylate or methacrylate or a mixture of these monomers and a hydroxy alkyl acrylate or methacrylate that has 1-4 carbon atoms in the alkyl group such as hydroxy ethyl acrylate, hydroxy propyl acrylate, hydroxy butyl acrylate, hydroxy ethyl methacrylate, hydroxy propyl methacrylate, hydroxy butyl methacrylate and the like or a mixture of these monomers.

One preferred silane acrylic polymer (C) contains the following constituents: about 1-30% by weight styrene, about 5-80% by weight gamma-methacryloxypropyl trimethoxysilane, and about 1-30% by weight isobutyl methacrylate, 1-30% by weight butyl acrylate, and more than 10% by weight, more preferably about 13-34% by weight hydroxy propyl acrylate. The total percentage of monomers in the polymer equal 100%. This polymer preferably has a weight average molecular weight ranging from about 1,000 to 20,000.

One particularly preferred silane acrylic polymer contains about 25% by weight styrene, about 30% by weight gamma-methacryloxypropyl trimethoxysilane, about 25% by weight of nonfunctional acrylates or methacrylates such as trimethylcyclohexyl methacrylate, butyl acrylate, and isobutyl methacrylate and any mixtures thereof, and about 20% by weight of hydroxy propyl acrylate.

The polymers prepared from ethylenically unsaturated monomers can be prepared by standard solution polymerization techniques, which are well-known to those skilled in the art, in which the monomers, solvent, and polymerization initiator are charged over a 1-24 hour period of time, preferably in a 2-8 hour time period, into a conventional polymerization reactor in which the constituents are heated to about 60-175° C., preferably about 110-170° C. The ratio of reactants and reaction conditions are selected to result in a silane polymer with the desired hydroxy functionality.

The hydroxy functional silane materials can also be oligomeric in nature. These materials are well known in that art.

Mixtures of polymeric and oligomeric hydroxy functional silane compounds may also be utilized in the present invention.

In addition to the hydroxy functional silane component described above, the coating composition optionally, but preferably, further includes, as part of the binder, another hydroxy functional silane component (D) which is different from (C). This component has a lower hydroxyl value (i.e., fewer hydroxyl groups) relative to component (C).

The low hydroxyl functional silane component (D) may be incorporated in the film-forming portion of the composition in an amount sufficient to achieve primerless adhesion to windshield bonding adhesives applied on top of the clearcoat. Typically, the low hydroxy functional silane component is used in an amount ranging from 0 to about 15% by weight, preferably from about 5 to 10% by weight, based on the weight of the binder.

The low hydroxy functional silane material (D), if present, contains an average of one or more hydrolyzable silyl groups and has a hydroxyl value of less than 45, preferably in the range of about 4 to 44, with a hydroxyl value in the range of about 4 to 40 being particularly preferred. This material can be an oligomeric or polymeric material including a polysiloxane based material. In this invention, polymeric materials, especially those prepared from ethylenically unsaturated monomers which are listed hereinafter, are generally preferred. This component may prepared in the same way as described for silane component (C) using any of the monomers listed above for component (C) and have the same molecular weight ranges, with the exception that reduced amounts of hydroxy functional monomers are incorporated in this polymer during polymerization.

In a preferred embodiment, the low hydroxyl functional silane polymer (D) is the polymerization product of ethylenically unsaturated monomers such as are listed hereinabove, of which from about 10 to 97% by weight, preferably 30 to 80% by weight, and more preferably 50 to 75% by weight, based on the weight of the polymer, are ethylenically unsaturated monomers which contain hydrolyzable silane functionality. The average number of hydroxyl groups on the polymer can vary; however such materials should have a hydroxyl number smaller than 45, preferably ranging from about 44 to 5, and more preferably from about 40 to 20 (mg KOH/g resin solids), in order to achieve the desired film properties.

Consistent with the above mentioned components, an example of a high hydroxy functional acrylic silane polymer useful in the practice of this invention is composed of polymerized monomers of styrene, an ethylenically unsaturated alkoxy silane monomer which is either an acrylate, methacrylate or vinyl alkoxy silane monomer or a mixture of these monomers, a nonfunctional acrylate or methacrylate or a mixture of these monomers and a hydroxy alkyl acrylate or methacrylate that has 1-4 carbon atoms in the alkyl group such as hydroxy ethyl acrylate, hydroxy propyl acrylate, hydroxy butyl acrylate, hydroxy ethyl methacrylate, hydroxy propyl methacrylate, hydroxy butyl methacrylate and the like or a mixture of these monomers.

One preferred silane acrylic polymer (D) contains the following constituents: about 1-30% by weight styrene, about 1-96% by weight gamma-methacryloxypropyl trimethoxysilane, and about 1-30% by weight isobutyl methacrylate, 1-30% by weight butyl acrylate, and less than 10% by weight, more preferably about 1-9% by weight hydroxy propyl acrylate. The total percentage of monomers in the polymer equal 100%. This polymer preferably has a weight average molecular weight ranging from about 1,000 to 20,000.

One particularly preferred silane acrylic polymer contains about 10% by weight styrene, about 65% by weight gamma-methacryloxypropyl trimethoxysilane, about 20% by weight of nonfunctional acrylates or methacrylates such as trimethylcyclohexyl methacrylate, butyl acrylate, and isobutyl methacrylate and any mixtures thereof, and about 5% by weight of hydroxy propyl acrylate.

These hydroxy functional silane materials can also be oligomeric in nature. These materials are well known in that art.

Mixtures of polymeric and oligomeric high hydroxy functional silane compounds may also be utilized in the present invention.

In addition to the above components in the coating composition, other film-forming and/or crosslinking solution polymers may be included in the present application. Examples include conventionally known acrylics, cellulosics, isocyanates, blocked isocyanates, urethanes, polyesters, epoxies or mixtures thereof. One preferred optional film-forming polymer is a polyol, for example an acrylic polyol solution polymer of polymerized monomers. Such monomers may include any of the aforementioned alkyl acrylates and/or methacrylates and in addition, hydroxy alkyl acrylates and/or methacrylates. Suitable alkyl acrylates and methacrylates have 1-12 carbon atoms in the alkyl groups. The polyol polymer preferably has a hydroxyl number of about 50-200 and a weight average molecular weight of about 1,000-200,000 and preferably about 1,000-20,000.

To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates and methacrylates listed hereinabove and mixtures thereof.

Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10-20% by weight of styrene, 40-60% by weight of alkyl methacrylate or acrylate having 1-6 carbon atoms in the alkyl group, and 10-50% by weight of hydroxy alkyl acrylate or methacrylate having 1-4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

In addition to the above components, a dispersed polymer may optionally be included in the coating composition. Polymers dispersed in an organic (substantially non-aqueous) medium have been variously referred to, in the art, as a non-aqueous dispersion (NAD) polymer, a non-aqueous microparticle dispersion, a non-aqueous latex, or a polymer colloid. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; 4,591,533; and 5,747,590, hereby incorporated by reference. In general, the non-aqueous dispersed polymer is characterized as a polymer particle dispersed in an organic media, which particle is stabilized by what is known as steric stabilization. According to the prior art, steric stabilization is accomplished by the attachment of a solvated polymeric or oligomeric layer at the particle-medium interface The dispersed polymers are known to solve the problem of cracking typically associated with top coatings, particularly coatings containing silane compounds, and are used in an amount varying from about 0 to 30% by weight, preferably about 10 to 25%, of total weight of resin solids in the composition. The ratio of the silane compound to the dispersed polymer component of the composition suitably ranges from 5:1 to 1:3, preferably 2:1 to 1:2. To accommodate these relatively high concentrations of dispersed polymers, it is desirable to have reactive groups (e.g., hydroxy groups) on the solvated portion of the dispersed polymer, which reactive groups make the polymers compatible with the continuous phase of the system.

A preferred composition for a dispersed polymer that has hydroxy functionality comprises a core consisting of about 25% by weight of hydroxyethyl acrylate, about 4% by weight of methacrylic acid, about 46.5% by weight of methyl methacrylate, about 18% by weight of methyl acrylate, about 1.5% by weight of glycidyl methacrylate to provide a crosslinked core and about 5% of styrene. The solvated arms that are attached to the core contain 97.3% by weight of a pre-polymer and about 2.7% by weight of glycidyl methacrylate, the latter for crosslinking or anchoring of the arms. A preferred pre-polymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by well known dispersion polymerization of monomers in an organic solvent in the presence of a steric stabilizer for the particles. The procedure has been described as one of polymerizing the monomers in an inert solvent in which the monomers are soluble but the resulting polymer is not soluble, in the presence of a dissolved amphoteric stabilizing agent.

A curing catalyst is typically added to catalyze the curing (i.e., crosslinking) reactions between the reactive components present in the composition. A wide variety of catalysts can be used, such as dibutyl tin dilaurate, dibutyl tin dilaurate, dibutyl tin diacetate, dibutyl tin dioxide, dibutyl tin dioctoate, tin octoate, aluminum titanate, aluminum chelates, zirconium chelate and the like. Sulfonic acids, such as dodecylbenzene sulfonic acid, either blocked or unblocked, are effective catalysts. Alkyl acid phosphates, such as phenyl acid phosphate, either blocked or unblocked, may also be employed. Any mixture of the aforementioned catalysts may be useful, as well. Other useful catalysts will readily occur to one skilled in the art. Preferably, the catalysts are used in the amount of about 0.1 to 5.0%, based on the total weight of the binder.

To improve the weatherability especially of a clear finish produced by the present coating composition, an ultraviolet light stabilizer or a combination of ultraviolet light stabilizers can be added to the topcoat composition in the amount of about 0.1-10% by weight, based on the total weight of the binder. Such stabilizers include ultraviolet light absorbers, screeners, quenchers, and specific hindered amine light stabilizers. Also, an antioxidant can be added, in the about 0.1-5% by weight, based on the total weight of the binder. Typical ultraviolet light stabilizers that are useful include benzophenones, triazoles, triazines, benzoates, hindered amines and mixtures thereof.

A suitable amount of water scavenger such as trimethyl orthoacetate, triethyl orthoformate, tetrasilicate and the like (pref. 2 to 6% by weight of binder) is typically added to the topcoat composition for extending its pot life. Aged paint may also lose its silane activity for primerless windshield sealant adhesion compatibility, due to moisture-initiated silane hydrolysis and condensation. It is believed that the presence of a moisture scavenger such as trimethyl orthoacetate could inhibit such a process by reacting with water and forming methanol and butyl acetate. Such reaction products do not hurt the silane activity. In fact, in-situ generated alcohol such as methanol may even help the silane groups to work against the alcohol-exchange reaction with acrylic polyols typically present in the coating composition. The alcohol-exchange reaction, if allowed to proceed, tends to negatively impact the crosslink density of the coating film.

About 3% microgel (preferably acrylic) and 1% hydrophobic silica may be employed for rheology control. The composition may also include other conventional formulation additives such as flow control agents, for example, such as Resiflow® S (polybutylacrylate), BYK® 320 and 325 (high molecular weight polyacrylates).

When the present composition is used as a clearcoat (topcoat) over a pigmented colorcoat (basecoat), small amounts of pigment can be added to the clearcoat to eliminate undesirable color in the finish such as yellowing.

The present composition also can be highly pigmented and used as a monocoat or basecoat of a basecoat/clearcoat finish. When the present coating composition is used as a monocoat or basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and other effect pigments such as pearlescent, i.e., mica, flakes, and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Conventional solvents and diluents are used as the liquid carrier to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

The coating composition can be applied by conventional means including spraying, electrostatic spraying, dipping, brushing, flowcoating and the like. The preferred techniques are spraying and electrostatic spraying. After application, the composition is typically baked at 100-150° C. for about 15-30 minutes to form a coating about 0.1-3.0 mils thick.

The coating composition of this invention is typically formulated as a one-package system although two-package systems are possible as will occur to one skilled in the art. The one-package system has been found to have extended shelf life.

When the composition is used as a clearcoat in a basecoat/clearcoat finish, it is applied over the pigmented basecoat which can be dried to a tack-free state and cured or preferably flash-dried for a short period before the clearcoat is applied. It is customary to apply a clear topcoat over a solvent-borne basecoat by means of a "wet-on-wet" application, i.e., the topcoat is applied to the basecoat without completely drying the basecoat. The coated substrate is then heated for a predetermined time period to allow simultaneous curing of the base and clearcoats. Application over water-borne basecoat normally requires some period of drying of the basecoat before application of the clearcoat. After application of the clearcoat, the substrate is typically flashed again and finally baked until the film is cured, or at least partially cured, at 100-150° C. for about 15-30 minutes to produce the coated article. The basecoat and clearcoat are preferably deposited to have thickness of about 0.1-2.5 mils and 1.0-3.0 mils, respectively.

After application and at least partial cure, the clearcoat composition of the present invention is particularly useful in providing not only good adhesion to both waterborne and solventborne basecoats, but also excellent intercoat adhesion to windshield sealants and excellent wrinkle free appearance.

EXAMPLES

The invention is further described in the following examples. The examples are merely illustrative and do not in any way limit the scope of the invention as described and claimed. All parts and percentages in the examples are on a weight basis unless otherwise indicated.

The following resins were prepared and used as indicated in Clearcoat Examples 1-2 and Comparative Examples 3 and 4.

Resin Example 1

Preparation of Carbamate Functional Oligomer for Use in Clearcoat Examples

A carbamate functional oligomer was prepared by charging the following ingredients into a reaction flask equipped with a heating mantle, stirrer, thermometer, nitrogen inlet and a reflux condenser:

|  | Parts by Weight (g) |
|---|---|
| Portion I | |
| Isocyanurate of hexane diisocyanate (DESMODUR ® 3300 from Bayer Corporation) | 1608 |
| Aromatic 100 Solvent (from Exxon Mobil Chemical Co) | 707 |
| Dibutyl tin dilaurate | 0.3 |
| Portion II | |
| Cyclohexanol | 783 |
| 2-Ethyl hexanol | 68 |
| Portion III | |
| Butanol | 347 |
| Total | 3513 |

Portion I was pre-mixed and charged into the reaction flask and heated to 100° C. under agitation and a nitrogen blanket. Then Portion II was added over a 120 minute period, in order to keep the exotherm temperature at or below 103-107° C. The reaction mixture was then held at 100° C. while mixing until essentially all of the isocyanate was reacted as indicated by infrared scan. After NCO in the IR absorbance plot is no longer detected, the reaction mixture was cooled to below 100° C. and Portion III was then added to adjust the solids content of the resulting solution to 70% by weight solids.

The resulting solution contained the following constituents HDI trimer/Cyclohexanol/2-Ethyl Hexanol in a weight ratio of 65/32/3.

Resin Example 2

Preparation of Hydroxy Functional Silane Polymers 1-2 for Use in Clearcoat Examples Acrylosilane polymer solutions were prepared by copolymerizing in the presence of a 2/1 Solvesso 100 Aromatic Solvent/butanol mixture, monomer mixtures of styrene (S), hydroxypropyl acrylate (HPA), methacryloxypropyl trimethoxy silane (MAPTS) (Silquest® A-174 from Crompton), butyl acrylate (BA), and isobutyl methacrylate (IBMA) in the presence of 8 parts by weight of Vazo® 67. The resulting polymer solution has a 71% solids content and a viscosity of F-R on the Gardner Holdt scale measured at 25° C. The polymer compositions are described in Table 1 and they all have a weight average molecular weight of approximately 4,500 gram/mole.

TABLE 1

|  | Silane Polymer 1 | Silane Polymer 2 |
|---|---|---|
| HPA | 20 | 10 |
| MAPTS | 30 | 65 |
| Sty | 25 | 10 |
| IBMA | 23 | 12 |
| BA | 2 | 3 |

Resin Example 3

Preparation of an Acrylic Microgel for Use in Clearcoat Examples

A methyl methacrylate/glycidyl methacrylate copolymer was prepared as an intermediate stabilizing polymer used in the synthesis of the below acrylic microgel resin. This stabilizing polymer was prepared by charging the following to a nitrogen blanketed flask equipped as above:

|  | Parts by Weight (g) |
|---|---|
| Portion I | |
| n-Butyl acetate | 195.800 |
| Portion II | |
| Methyl methacrylate | 139.000 |
| n-Butyl acetate | 14.410 |
| Glycidyl methacrylate | 13.060 |
| Glycidyl methacrylate/12-Hydroxystearic acid copolymer (60% by weight solids solution of 89.2% 12-HAS/10.8% GMA in a 80/20 blend of toluene and petroleum naphtha) | 181.660 |
| Petroleum Naphtha (Exxsol ® D-3135 from Exxon) | 40.570 |
| n-Butyl acetate | 13.060 |
| Portion III | |
| 2,2'-azobis(2-methylbutyronitrile) (Vazo ® 67 from DuPont) | 8.010 |
| n-Butyl acetate | 71.590 |
| Petroleum Naphtha (Exxsol ® D-3135 from Exxon) | 74.330 |
| Portion IV | |
| 4-tert-Butyl catechol | 0.040 |
| n-Butyl acetate | 2.690 |
| Portion V | |
| Methacrylic acid | 2.710 |
| n-Buyl acetate | 6.020 |
| Potion VI | |
| N,N'-dimethyl dodecyl amine | 0.360 |
| n-Butyl acetate | 2.690 |
| Total | 766 |

Portion I was charged to the reactor and brought to a temperature of 96 to 100° C. Portions II and III were separately premixed and then added concurrently over a 180 minute period, while maintaining a reaction temperature of 96 to 100° C. The solution was then held for 90 minutes. In sequence, Portions IV, V, and VI were separately premixed and added to the reactor. The reaction solution was then heated to reflux and held until the acid number is 0.5 or less. The resulting polymer solution has a 40% solids content.

The acrylic microgel resin was then prepared by charging the following to a nitrogen blanketed flask equipped as above:

|  | Parts by Weight (g) |
|---|---|
| Portion I | |
| Methyl methacrylate | 15.187 |
| Mineral spirits (Exxsol ® D40 from Exxon) | 97.614 |
| Methyl methacrylate/Glycidyl methacrylate stabilizer copolymer (prepared above) | 4.678 |
| Heptane | 73.638 |
| 2,2'-azobis(2-methylbutyronitrile) (Vazo ® 67 from DuPont) | 1.395 |

-continued

| | Parts by Weight (g) |
|---|---|
| Portion II | |
| N,N-dimethylethanolamine | 1.108 |
| Methyl methacrylate | 178.952 |
| Methyl methacrylate/Glycidyl methacrylate stabilizer copolymer (prepared above) | 58.271 |
| Glycidyl methacrylate | 2.816 |
| Methacrylic acid | 2.816 |
| Styrene | 75.302 |
| Hydroxy Ethyl Acrylate | 23.455 |
| Heptane | 198.512 |
| Mineral Spirits (Exxsol ® D40 from Exxon) | 32.387 |
| Portion III | |
| 2,2'-azobis(2-methylbutyronitrile) (Vazo ® 67 from DuPont) | 2.024 |
| Toluene | 12.938 |
| Heptane | 30.319 |
| Portion IV | |
| Heptane | 9.588 |
| Portion V | |
| Resimene ® 755 | 246.3 |
| Total | 1067.3 |

Portion I was charged into the reaction vessel, heated to its reflux temperature, and held for 60 minutes. Portions II and III were premixed separately and then added simultaneously over a 180 minute period to the reaction vessel mixed while maintaining the reaction mixture at its reflux temperature. Portion IV was then added. The reaction solution was then held at reflux for 120 minutes and then 246.3 pounds of the solvent was stripped. The resin was then cooled to 60° C. and mixed with Portion V. Mixing was continued for 30 minutes.

The resulting polymer solution has a weight solids of 70%, and a viscosity of 50 centipoise (By Brookfield Model RVT, Spindle #2, at 25° C.).

Clearcoat Examples 1-2 and Comparative Examples 3-4

Preparation of Clearcoat Compositions

Four clearcoat compositions were prepared by blending together the following ingredients in the order given:

TABLE 2

| | Ex. 1 | Ex. 2 | C. Ex. 3 | C. Ex. 4 |
|---|---|---|---|---|
| Microgel[1] | | 3% | | 3% |
| Melamine[2] | 22% | | | |
| Melamine[3] | | 22% | 17% | 17% |
| Melamine[4] | | | 17% | 5% |
| Melamine[5] | | | | 5% |
| HALS Tinuvin 123[6] | 1% | 1% | 1% | 1% |
| UVA Tinuvin 928[7] | 2% | 2% | 2% | 2% |
| NAD[8] | 18% | 15% | 24% | 19% |
| Catalyst[9] | 1% | 1% | 1% | 1% |
| Flow Aid[10] | 0.31% F.w. | 0.31% F.w. | 0.31% F.w. | 0.31% F.w. |
| Silica Dispersion[11] | 10% F.w | 10% F.w | 10% F.w | 10% F.w |
| Moisture Scalvenger[12] | 2% F.w. | 2% F.w. | 2% F.w. | 2% F.w. |
| Urethane Oligomer[13] | 18% | 15% | | |
| Silane Polymer 1 | 32% | 30% | 44% | 46% |
| Silane Polymer 2 | | 5% | | |
| Solvent[14] | 3% F.w. | 3% F.w. | 3% F.w. | 3% F.w. |

Table Footnotes
*All the numbers in this table are by % non-volatile, except for those noted as f.w. which means by formula weight.
[1]Resin Example 3.
[2]Resimene ® 4514 intermediate melamine supplied by Surface Specialties UCB, St. Louis, MO.
[3]Cymel ® 1161 monomeric melamine supplied by Cytec Industries Inc., West Patterson, New Jersey.
[4]Cymel ® 1168 monomeric melamine supplied by Cytec Industries Inc., West Patterson, New Jersey.
[5]Resimene ® 717 polymeric melamine supplied by Surface Specialties,
[6]Tinuvin ® 123 supplied by Ciba Specialty Chemicals, Tarrytown, New York.
[7]Tinuvin ® 928 supplied by Ciba Specialty Chemicals, Tarrytown, New York.
[8]Non-aqueous dispersion resin (NAD) prepared in accordance with the procedure described in the US Patent 5,747,590 at column 8, lines 46–68 and column 9, lines 1–25, all of which is incorporated herein by reference.
[9]Dodecyl benzene sulfonic acid salt of 2-amino-2-methyl-1-propanol supplied by King Industries, Norwalk, Connecticut.
[10]Disparlon LC-955, King Industries, Norwalk, CT.
[11]Aersil R-805 Grind (from Degussa, Parsipany, New Jersey)
[12]Trimethyl orthoacetate supplied by Chem Central, Bedford Park, IL.
[13]Resin Example 1.
[14]Butanol, supplied by Chem Central, Bedford Park, IL.

The coating compositions of Clearcoat Examples 1-2 and Comparative Examples 3 and 4 were reduced to 38 seconds on a #4 Ford cup with ethyl 3-ethoxy propionate (EEP). These reduced clearcoat samples were bell-sprayed to either a waterborne black base-coat or a solvent-borne silver metallic base-coat over a steel substrate which was already coated with a layer each of electro-coat and primer surfacer. The waterborne Ebony basecoat is commercially available from DuPont under DuPont Code of 686S40343, and the solvent-borne Silver is also commercially available from DuPont under DuPont Code of 647A01147. The primer surfacer used is commercially available from DuPont under DuPont Code of 554-DN082. The electrocoat used is commercially available from DuPont under the name of ED5050.

The basecoats were generally applied in two coats by bell with 60 seconds flash in between over a primed, electro-coated steel substrate under a booth condition of 75° F. and 55% humidity.

Testing Procedures Used in the Examples

For physical property tests such as scratch resistance and adhesion to windshield adhesives, the clear compositions were applied to the Ebony basecoated panels after 5-minute basecoat flash at room temperature. The applied clearcoat was allowed to flash in air for approximately 10 minutes before baking. All the clearcoat Examples 1-2 and Comparative Examples 3-4 were baked at 140° C. for 20 minutes. The final dry film thickness was 15-20 microns for the base-coats and 40 to 50 microns for the clear-coats.

For scratch resistance tests, all the baked samples were allowed to age for at least 24 hours. Fracture energy and plastic deformation were measured by a nano-scratch test method published by Ford Motor Co. (PA-0171).

For primerless MVSS windshield sealant adhesion tests, within 12 hours of bake, a bead of windshield adhesive was applied to the clearcoat surface primerless (quick knife adhesion test according to GM4352M and GM9522P specifications published by General Motors Corporation). The windshield adhesive used is commercially available from Dow Essex Specialty Products Company and is identified as Betaseal™ 15626.

The windshield adhesive bead was allowed to cure for 72 hours at 73° F. (23° C.) and 50% humidity. The size adhesive beads were about 6×6×250 mm and the cured beads were cut with a razor blade. The interval between the cuts was at least 12 mm apart. The desirable result is 100% cohesive failure (CF) of the adhesive beads, rather than a failure due to a loss of adhesion between the adhesive and the clearcoat or within the clearcoat or underlayers. The results for Examples 1-2 and Comparative Examples 3 and 4 are reported in Table 3, below.

For appearance evaluation over waterborne base-coat, the clear compositions of Examples 1 and 3 were applied to the Ebony base-coated panels which were sprayed at 50% humidity, followed by a 3-minute room temperature flash, 3-minute heated flash at 80° C., and 30 minutes further flash at room temperature. The applied basecoats and clearcoats were baked at 140° C. for 30 minutes. The final dry film thickness was 10-13 microns for the base-coat and 45-50 microns for the clear-coats. The appearances of the panels were measured by QMS (Quality Measurement Systems from Autospec America) which provides a combined measurement of gloss, distinctness of image, and orange peel. Typical QMS numbers for automotive finishes are 45-80 with higher numbers meaning better appearance.

For appearance evaluation over solvent-borne base-coat, the clear compositions of Examples 2 and 4 were applied to the Silver metallic base-coated panels after a 5-minute base-coat flash at room temperature. The final composites of wet basecoats and clearcoats were baked at 140° C. for 30 minutes. The final dry film thickness was 15-20 microns for the base-coats and 45-50 microns for the clear-coats. The appearances of the panels were measured by QMS (Quality Measurement Systems from Autospec America) which provides a combined measurement of gloss, distinctness of image, and orange peel. Typical QMS numbers for automotive finishes are 40-75 with higher numbers meaning better appearance.

For the adhesion tests of the clearcoat examples over the baked wet-on-wet substrates, a solvent-borne primer (coded as 1143A01239, commercially available from DuPont) was sprayed by hand over a steel substrate which was already coated with a layer of electrocoat. After 2 minutes of flash of the primer, a layer of solvent-borne Arizona Beige (coded as 647S40330, commercially available from DuPont) was applied by hand wet-on-wet over the wet primer surface. After five more minutes of flash, the wet-on-wet (WOW) panels were baked at 165° C. for 30 minutes. After the WOW panels were cooled down to room temperature, the clear-coat compositions were sprayed by hand to a dry film build of 40-50 microns. After 10 minutes of clear-coat flash, panels were baked under several under-bake conditions for 10 minutes: 125° C., 130° C., and 135° C. These panels were then cut and exposed for Cleveland humidity exposure and Xenon before the adhesion tests.

The Cleveland humidity tests were conducted according to the test method described by Ford (BQ 104-02). For the convince of comparison, the Cleveland humidity chamber was set at 60° C. and the panels will be exposed to the chamber for 16 hours before tested for clear-coat adhesion over the pre-baked wow substrates. The test protocol was following Method "B" of FLTM BI 106-01 published by Ford Motor Company.

The Xenon exposure was conducted according to Ford specification published as SAEJ1960. The Xenon exposed panels would be immersed in a 32+/−1° C. water bath for 16 h (FLTM BI 104-01) and followed with adhesion tests according to Method "B" of FLTM BI 106-01 published by Ford Motor Company.

Paint Results

The results of appearance, nano-scratch, primerless MVSS compatibility, and clear-coat adhesion to the WOW substrates are summarized in Table 3:

TABLE 3

| | Appearance* | | 8-week | | Nano-Scratch | | CC Adh to WOW Substrates | | | | | |
| | | | | | | | CC Bake for 10' × 255° F. | | CC Bake for 10' × 265° F. | | CC Bake for 10' × 275° F. | |
| Clear-coat | Over WBBC | Over SBBC | Jacksonville Etch Rating** | Primerless MVSS | Fract. E. | Plastic Deform | CHC | Xenon | CHC | Xenon | CHC | Xenon |
|---|---|---|---|---|---|---|---|---|---|---|---|---|
| Ex. 1 | 60 | 37 | 4.9 | 100% CF | 12 mN | 0.30 | 100% | 100% after 6000 h | 100% | 100% after 6000 h | 100% | 100% after 6000 h |
| Ex. 2 | 47 | 64 | 5 | 100% CF | 12 mN | 0.30 | 100% | 100% after 6000 h | 100% | 100% after 6000 h | 100% | 100% after 6000 h |
| C. Ex. 3 | 60 | 37 | 5.4 | 100% CF | 8 mN | 0.36 | 0% | 0% after 1500 h | 95% | 0% after 2500 h | 100% | 0% after 3000 h |
| C. Ex. 4 | 37 | 65 | 5.2 | 100% CF | 9.5 mN | 0.34 | 100% | 0% after 3000 h | 100% | 0% after 3500 h | 100% | 0% after 4000 h |

Table Footnotes
*Scale of 1-100: the higher the QMS number, the better the appearance.
**Average of 10 Panels exposed in the summer of 2004 at Jacksonville, Florida for 14 weeks of acid rain exposure. The exposed panels were rated for a severity rating of 0-10, with 0 meaning zero etch and 10 meaning very severe etch spots were produced.

As Table 3 shows, clear Examples 1 and 2 showed equivalent appearance to the respective control Examples (3 and 4), which were formulated for waterborne and solvent-borne basecoats respectively. Also, both the clearcoat examples 1 and 2 showed robust primerless MVSS compatibility and equal or better etch resistance than the controls. The major advantages of the clearcoat examples 1 and 2 over the control examples 2 and 4 are their largely improved fracture energy and plastic deformation for scratch and mar resistance. Also, examples 1 and 2 are both acceptable for adhesion over baked wet-on-wet applied substrates while the control examples were not.

The above examples demonstrated that with the use of high hydroxy dual (silyl/OH) functional silane in the carbamate system, a hybrid cure of carbamate and hydroxy crosslinking with melamine, with the help of silane condensation, clearcoats of excellent appearance and physical properties can be achieved with both waterborne and solventborne basecoats. Such properties included etch and mar resistance, primerless MVSS compatibility and adhesion over the baked basecoat-to-primer wet-on-wet substrates. This is important as the auto plants, which are practicing wet-on-wet two-tone applications, could be using solventborne basecoats, waterborne basecoats, or both. While, both of the control examples, especially the control example 3 which used high imino polymeric melamine (Resimene®) 717: 2.3 mole of NH per triazine ring, see *Polym. Prepr. (Am. Chem. Soc., Div. Polym. Chem)* 44(1), 259 (2003)) for waterborne basecoat, showed inferior performance for wet-on-wet adhesion and scratch and mar resistance.

Further, use of low imino aminoplastic resin (Resimene® 4514: 0.5 mole of NH per triazine ring) in Example 1 did not compromise the appearance and performance for wet-on-wet adhesion and scratch and mar resistance. The importance of carbamate for wet-on-wet adhesion and scratch and mar resistance is also evident in Example 2 which is suitable for good appearance over solventborne basecoat, as it also exhibited better scratch and mar resistance and wet-on-wet adhesion than control Example 4, though Example 4 did not use high imino polymeric aminoplast resins.

Various other modifications, alterations, additions or substitutions of the component of the compositions and processes of this invention will be apparent to those skilled in the art without departing from the spirit and scope of this invention. This invention is not limited by the illustrative embodiments set forth herein, but rather is defined by the following claims.

What is claimed is:

1. A curable coating composition comprising a film-forming binder and an organic liquid carrier; wherein the binder comprises:
   (A) 5 to 60% by weight of a curable film-forming material having a plurality of carbamate groups;
   (B) 15 to 45% by weight of one or more curing agents for component (A) comprising at least one monomeric alkylated melamine formaldehyde resin;
   (C) 10 to 50% by weight of a hydroxy functional silane component containing at least one hydrolyzable silane group and having a hydroxyl value of 45 mg KOH/g or above; and
   (D) a second hydroxy functional silane component containing at least one hydrolyzable silane group and having a hydroxyl value of 44 mg KOH/g or less;
wherein the percentages by weight are based on the weight of the binder; and
wherein the hydrolyzable silane groups of said (C) hydroxy functional silane component and said (D) second hydroxy functional silane component are derived from monomers that are selected from the group consisting of structures according to (1), (2) and a combination thereof;

$$CH_2=\underset{R_3}{\overset{|}{C}}-\overset{O}{\overset{\|}{C}}OCH_2-(CH_2)_n-CH_2-\underset{OR_2}{\overset{R}{\underset{|}{Si}}}-OR_1; \quad (1)$$

wherein R is $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10;

$$CH_2=\underset{R_4}{\overset{|}{C}}-\overset{O}{\overset{\|}{C}}-O-R_5-OC\underset{\overset{\|}{O}}{\overset{H}{\underset{|}{N}}}-(CH_2)_n-\underset{OR_2}{\overset{R}{\underset{|}{Si}}}-OR_1; \quad (2)$$

wherein R is $CH_3$, $CH_3CH_2$, $CH_3O$, or $CH_3CH_2O$; $R_1$ and $R_2$ are independently $CH_3$ or $CH_3CH_2$; $R_4$ is H or $CH_3$, $R_5$ is an alkylene group having 1-8 carbon atoms and n is a positive integer from 1-8 and wherein component D is present and is present at up to a maximum of 15% by weight based on the weight of the binder.

2. The composition of claim 1 wherein the hydroxyl groups on the silane component are primary hydroxyl groups.

3. The composition of claim 1, wherein component (A) is a carbamate functional oligomer with secondary carbamate groups.

4. The composition of claim 1, wherein the curing agent component (B) contains essentially no polymeric melamine.

5. The composition of claim 1, wherein component (C) is a hydroxy-functional acrylosilane polymer with a hydroxyl value greater than 45.

6. The composition of claim 1, wherein component (D) is a hydroxy-functional acrylosilane polymer with a hydroxyl value smaller than 44.

7. The composition of claim 1 wherein the one or more curing agents (B) consist of at least one monomeric alkylated melamine curing agent with a 0-1.2 mole of NH per triazine ring.

8. A curable coating composition comprising 45-90% by weight of a film-forming binder and 10-55% by weight of an organic liquid carrier; wherein the binder contains:
   a) 5 to 60% by weight of a curable film-forming oligomer or polymer having a plurality of secondary carbamate groups;
   b) 15 to 45% by weight of one or more curing agents comprising at least one monomeric alkylated melamine formaldehyde resin with 0 to 1.2 mole or less of NH per triazine ring;
   c) 10 to 50% by weight of a curable film-forming hydroxy functional silane oligomer or polymer having a hydroxyl number of 45 to 150 and comprising polymerized ethylenically unsaturated monomers of which 5 to 80% by weight contain hydrolyzable silyl functionality;
   d) a curable film-forming hydroxy functional silane oligomer or polymer having a hydroxyl number of 4 to 44 mg KOH/g and comprising polymerized ethylenically unsaturated monomers of which 10 to 97% by weight contain hydrolyzable silyl functionality; and
   e) a non-aqueous dispersed polymer,
wherein the percentages by weight are based on the weight of the binder; and
wherein the silane groups of said (c) hydroxy functional silane oligomer or polymer and said (d) hydroxy functional silane oligomer or polymer are derived from monomers that are selected from the group consisting of structures according to (1), (2) and a combination thereof;

$$CH_2=\underset{R_3}{\overset{|}{C}}-\overset{O}{\overset{\|}{C}}OCH_2-(CH_2)_n-CH_2-\underset{OR_2}{\overset{R}{\underset{|}{Si}}}-OR_1; \quad (1)$$

wherein R is $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10;

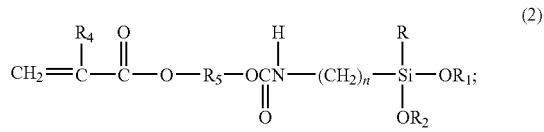 (2)

wherein R is $CH_3$, $CH_3CH_2$, $CH_3O$, or $CH_3CH_2O$; $R_1$ and $R_2$ are independently $CH_3$ or $CH_3CH_2$; $R_4$ is H or $CH_3$, $R_5$ is an alkylene group having 1-8 carbon atoms and n is a positive integer from 1-8 and wherein the hydroxy functional silane oligomer or polymer having a hydroxyl number of 4 to 44 mg KOH/g is present and is present at up to a maximum of 15% by weight based on the weight of the binder.

9. The composition of claim 8, wherein the curing agent component (b) contains essentially no polymeric melamine.

10. The composition of claim 8 wherein component (c) and (d) are acrylic polymers consisting essentially of polymerized monomers of styrene, an ethylenically unsaturated alkoxy silane-containing monomer selected from the group consisting of acrylate, methacrylate or any mixtures thereof, a non-functional acrylate or methacrylate and a hydroxy alkyl acrylate or methacrylate that has 1-4 carbon atoms in the alkyl group; wherein the acrylic polymer has a weight average molecular weight of about 1,000-20,000.

11. The composition of claim 8 wherein the composition further contains a moisture scavenger.

12. The coating composition of claim 1, wherein said composition is a clearcoat for a basecoat/clearcoat finish.

13. The coating composition of claim 8, wherein said composition is a clearcoat for a basecoat/clearcoat finish.

14. A substrate coated with the dried and cured composition of claim 1.

15. An automobile or truck exterior body coated with the dried and cured composition of claim 1.

16. A process for coating a substrate, comprising:
  (A) applying a layer of a pigmented basecoating to the substrate to form a basecoat thereon;
  (B) applying over said basecoat, a clearcoat layer comprised of the composition of claim 1;
  (C) curing the basecoat and clearcoat to form a multi-layer topcoat over the substrate.

* * * * *